Oct. 26, 1926.
E. M. NELSON
1,604,594
PISTON
Filed Sept. 14, 1925    2 Sheets-Sheet 1
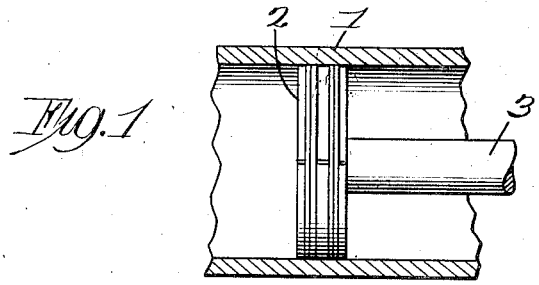
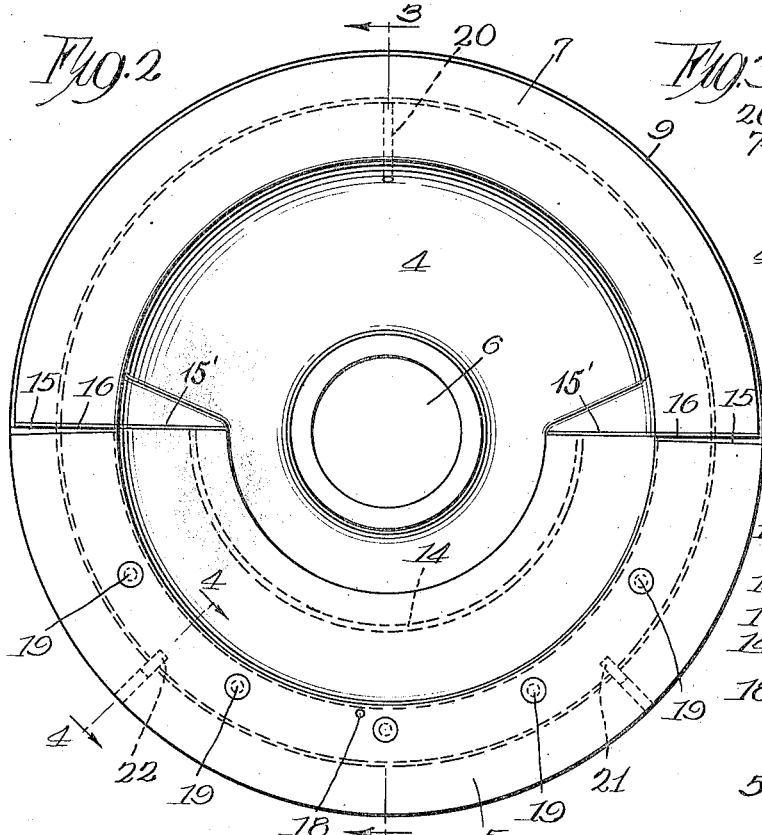
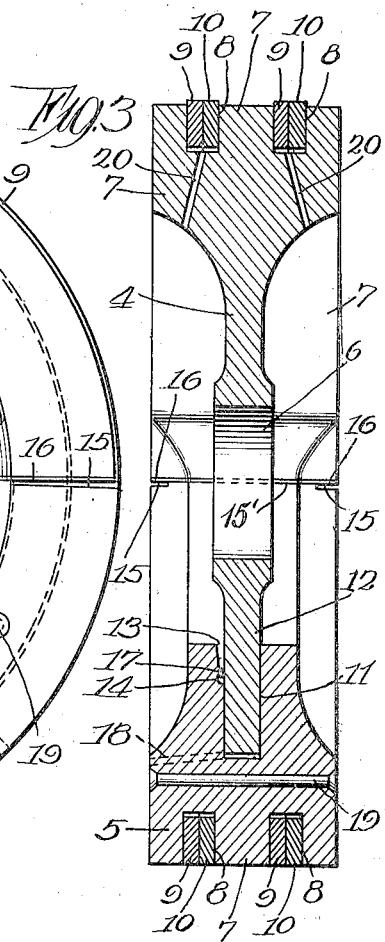
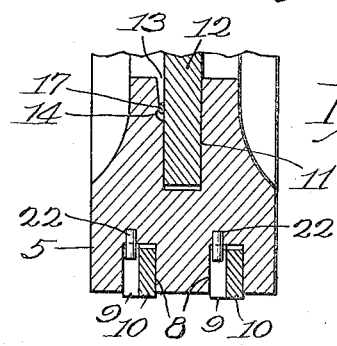
Inventor:
Edwin M. Nelson
By Wm. C. Bell, Atty.

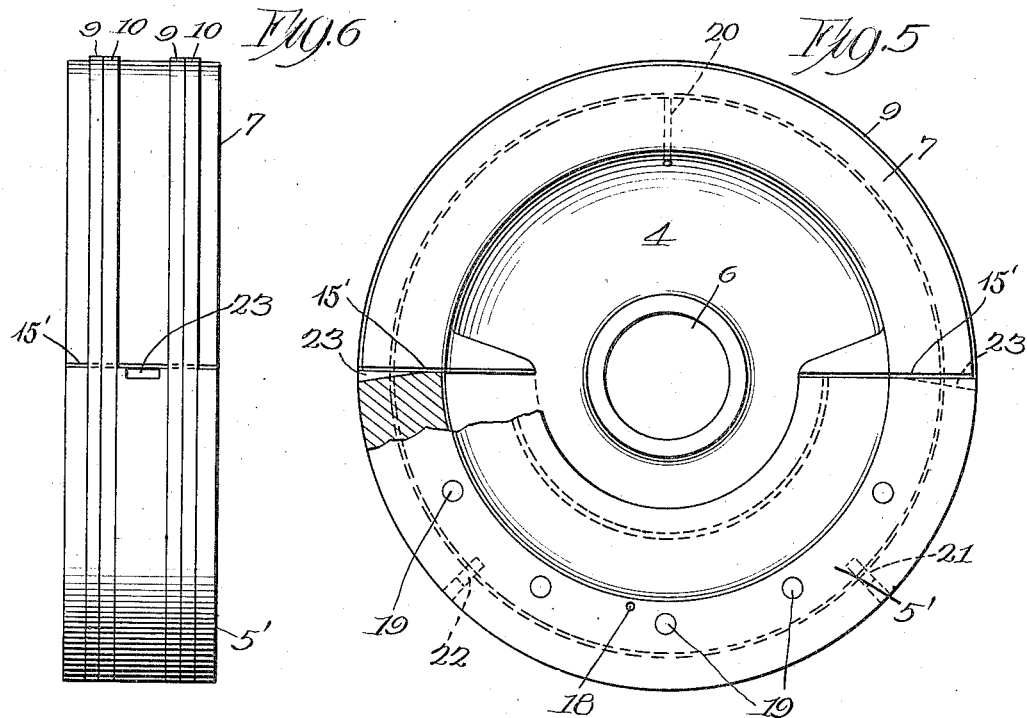
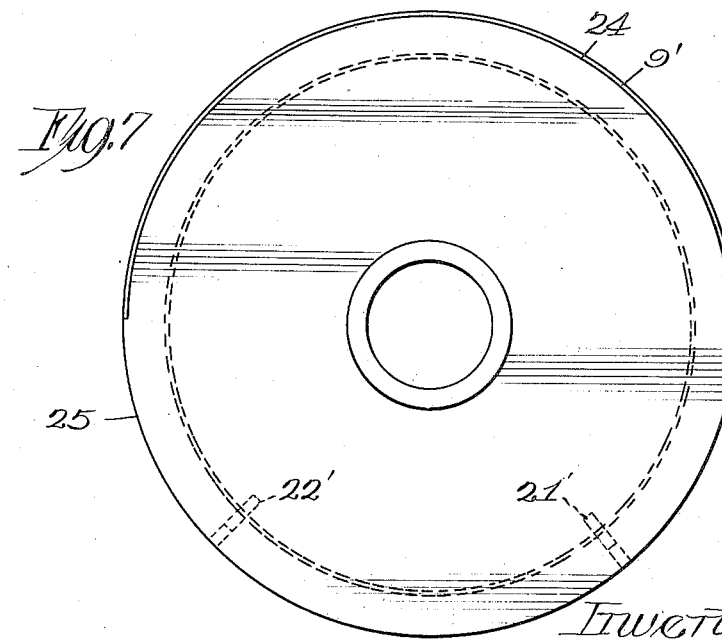

Patented Oct. 26, 1926.

1,604,594

UNITED STATES PATENT OFFICE.

EDWIN M. NELSON, OF SAVANNA, ILLINOIS.

PISTON.

Application filed September 14, 1925. Serial No. 56,105.

When a piston is employed in a cylinder occupying a horizontal or inclined position, the weight of the piston must be borne by one side of the cylinder. The result is that the piston and cylinder rapidly become oval shaped instead of round resulting in loss of power due to escape of steam or other gas past the piston. Various means have been attempted to be used to overcome the above difficulty as for example, the provision of tail rods and auxiliary cross heads. None of the devices which have been previously tried have been found satisfactory and it is therefore the principal object of my invention to provide a piston which shall at all times have a full half cylinder bearing so that any wear which takes place shall be distributed uniformly throughout the lower half of the piston and cylinder.

Another object of my invention is to provide a piston which is capable of ready adjustment to take up the wear between the piston and the cylinder and to do so in such a manner that the full half cylinder bearing shall still be maintained.

More specifically an object of my invention is to provide a piston made in sections, one section being in the form of a shoe which can be adjusted to take up wear in the cylinder together with means for securely fastening the sections of the piston in adjusted position so that the noise generally known as "slap" shall be avoided.

Other and further objects will become apparent as the description is read in connection with the accompanying drawing in which Fig. 1 is a longitudinal sectional view through a portion of a cylinder showing a piston in elevation therein.

Fig. 2 is a transverse elevation of a piston constructed according to my invention.

Fig. 3 is a section on the line 3—3 of Fig. 2 and

Fig. 4 is a fragmentary section on the line 4—4 of Fig. 2.

Fig. 5 is a view similar to Fig. 2, but showing a modified form of means for adjusting the shoe.

Fig. 6 is a view taken at right angles to that of Fig. 5.

Fig. 7 is a diagrammatic view of a piston showing another form which my invention may take.

Referring now to the drawings and particularly to Figs. 1, 2, 3 and 4, the numeral 1 designates a portion of a cylinder in which reciprocates a piston 2 carried by a piston rod 3. The piston is made in two sections, a main section 4 and a shoe 5. The main section is provided with a central aperture 6 furnishing means for securing the piston to the rod 3 and also is provided with the flange 7 extending through substantially the upper half of the circumference of the piston and provided with peripheral recesses 8 within which are received piston rings 9 and 10.

The lower half of the piston does not have the flange integral therewith, but the flange is in the form of the separate shoe 5 having a recess 11 to receive the reduced central portion 12 of the main section, which is in the form of a disk as shown. On one side of this reduced portion the shoe is provided with a wedge-shaped recess 13 terminating in a groove 14 and forming an extension of the recess 11, as plainly shown in Figs. 3 and 4. At the top of the shoe there are provided spaces 15 between the shoe and the bottom edges 16 of the flange 7. By this means when it is desired to adjust the shoe outwardly from the center of the piston, a pair of wedges joined together and commonly known as a twin wedge are forced into the spaces 15 to force the shoe downwardly. This twin wedge is a well known tool which forms no part of my invention and which I therefore deem it unnecessary to illustrate or describe further. This action, of course, results in separating the top edges of the shoe from the bottom edges 16 of the flange. Suitable gaskets 15' are employed in this space in order to insure a tight joint, such gaskets being employed at all times. When the piston is first assembled before placing in the cylinder, gaskets are employed between the top edges of the shoe and the bottom edges of the upper flange to insure a tight joint and any slight adjustment may be made without replacing these gaskets because of their expansion. Obviously, however, this is a matter which will be controlled by the conditions of the particular adjustment which is being made. After the adjustment has been made, the shoe is then secured in position by placing in the recess 13 a rod 17 made of soft material such as copper, which is then driven into position, as shown in Figs. 3 and 4. This rod is of greater diameter than the width of the wedge shaped recess at its bottom so that it will be distorted as it passes the corner at the edge of the groove 14, thereby securely holding the shoe in position.

The shoe 5 is preferably made of bronze or other suitable bearing material. Such material usually has a different co-efficient of expansion than the main section of the piston and therefore I employ the above means for fastening the two together to insure a tight fit at all times, any tendency to looseness due to the different co-efficients of expansion being taken up by the tendency of the distorted rod 17 to return to its initial position. This rod 17 while made of relatively soft material is nevertheless resilient enough to tend to return to its original form. The amount of relative movement which has to be compensated by this resiliency is exceedingly small as will be obvious.

The bottom of the recess 11 is provided with one or more weep holes 18 to prevent collection of moisture therein. Due to the presence of the recess 11 a certain tendency is created to crack the portion of the shoe lying on one side or the other thereof and to resist this tendency I provide a plurality of rivets 19 to reinforce the shoe. In order to insure that the rings 9 and 10 shall always be urged outwardly into engagement with the wall of the cylinder, I provide the bores 20 which permit steam to enter the recesses 8 from either side of the piston, the pressure of this steam obviously forcing the rings outwardly.

In order to insure that the joints in the rings shall occur in the shoe, I provide pairs of dowels 21 and 22 so arranged as to occupy the space between the ends of the rings and staggered so that at least one ring shall always prevent leakage of steam by the piston. These dowels prevent the joints in the rings from ever coinciding with the point of contact between the upper edges of the shoe and the lower edges 16 of the flange, and also prevent the joints from occurring in the upper part of the piston. There is always a tendency for the piston to pull away from the top wall of the cylinder due to its weight and due to the fact that it rests upon the bottom of the cylinder and therefore it is obvious that the best place for these joints is in the bottom of the cylinder so that the top may be effectually sealed by continuous rings.

It is common practice to make the radius of the piston slightly less than the radius of the cylinder in which the piston reciprocates, the difference in radii usually being one-sixteenth of an inch. The piston rings are then relied upon for a tight joint between the piston and the cylinder. Obviously there is going to be more clearance at the top of the piston than at the bottom due to the tendency of the piston to rest upon the bottom because of its weight. Ultimately it will rest upon the bottom and make a one point contact therewith, thus causing the piston and the cylinder to wear to an oval shape. With my invention, as described above, the shoe is adjusted so as to avoid this one point contact and so as to keep the entire length of the edge of the shoe in contact with the cylinder. The wear is thereby distributed over a greater area and is consequently less in amount and is uniform. Moreover, the piston rings are not relied upon for a tight fit between the lower half of the piston and the cylinder and therefore it does not matter if there is a gap between the ends of the piston rings. Such a gap will, of course, be present at the dowels 21 and 22 and will increase as wear occurs and as adjustment is made to compensate for the wear, because the pressure of the steam, exerted through the bores 20 will force the piston rings upwardly. In other words the piston rings could if desired, be dispensed with for the lower part of the piston. By using the bores 20 in this manner, the piston rings will still be forced into contact with the top of the cylinder even after they have lost their resiliency.

While not absolutely necessary to do so, I prefer to make the radius of the shoe one-sixteenth of an inch greater than the radius of the flange 7, or in other words, of a radius such that the shoe will contact with the cylinder throughout its length and so that the piston rings will not be relied upon in any manner for wear in the lower part of the piston and so that the piston will be supported by a full half cylinder bearing. I have shown this construction in all forms of my invention illustrated.

In Figs. 5 and 6 I have shown a piston substantially similar to that illustrated in Figs. 2, 3 and 4, the only difference being that the shoe 5' does not have the spaces 15 for the reception of a twin wedge. In place thereof I provide the edge of the shoe with apertures 23 whereby the adjustment of the shoe may be effected by employment of a wedge shaped tool without the necessity of using a twin wedge. Otherwise the construction of this form of my invention is the same as that previously described.

In Fig. 7 I have shown a piston which may be made of one piece or of a so called box type and in which no means is provided for adjustment. It will be noted that in this form of my invention the relation of the radii of the upper half of the piston and the lower half is the same as in the other form shown, the radius of the upper half 24 being less than that of the lower half 25 by approximately one-sixteenth of an inch, the usual clearance between piston and cylinder. In other words the lower half 25 of the piston is of a radius to fit the cylinder and to form a half cylinder support for the entire piston, whereas the upper half 24 has the usual clearance between piston and cylinder. The usual piston rings 9' are employed and the joints therein are maintained in the lower half 25 by dowels 21', 22' in the same manner as described above in connection with the other embodiments of my invention.

From the above it will be apparent that I have provided a novel and improved piston which shall at all times provide a substantially complete half cylinder bearing to support the piston in the cylinder. This I consider to be the broad aspect of my invention and while I have referred to a half cylinder bearing, it is, of course, understood that by that term I mean a bearing extending through substantially the lower half of the piston and do not intend to limit myself to a bearing extending through exactly 180°. The exact length of the bearing might obviously be varied somewhat without departing from the scope of my invention.

Furthermore, by making the lower part of the piston with an increased radius the full effective area of the piston is maintained and as wear takes place and adjustment is made to take up such wear, in the forms in which adjustment is provided for, it will be obvious that the effective area is increased and that without any additional expense such as is involved in the use of known methods of repair, which involve building up the piston to take up the wear.

It will also be apparent that I have devised a piston which may be readily adjusted to take up wear and which shall, nevertheless, act as a bearing on the lower part of the cylinder wall to uniformly distribute the load. As wear takes place the adjustment may be easily effected without having to build up the piston or repair the damage in any of the other well known manners.

While I have described my invention as employed in a horizontal cylinder, it is not necessarily so limited, but may be used wherever the cylinder is arranged so that the wear is all on one side. It may be used as either a driving or a driven piston and insures a uniform wear throughout a long life. I have referred to steam as being used with my piston, but it is obvious that the piston is adapted for use with any fluid with which pistons are usually employed.

I am aware that changes in the form, construction and arrangement of parts may be made without departing from the spirit and without sacrificing the advantages of the invention and I reserve the right to make all such changes as fairly fall within the scope of the following claims:

I claim:

1. The combination of a cylinder and a piston operating therein, said piston being divided diametrically into substantially half sections, the circumference of one of the half sections fitting the cylinder, the circumference of the other section of the piston having a clearance within the cylinder, and the piston sections being mutually adjustable towards and away from one another.

2. The combination of a substantially horizontal cylinder and a piston working therein, said piston being divided diametrically into upper and lower substantially half sections, the circumference of the lower section fitting the cylinder, the circumference of the upper section having a clearance within the cylinder, and the upper piston section being adjustable vertically upon the lower piston section.

3. A piston comprising a main section having a portion in the form of a disk, a shoe having a recess receiving said disk and movable thereon, and means for securing said shoe in adjusted position on said disk.

4. A piston comprising a main section, a shoe having a recess receiving said main section and movable thereon, means for securing said shoe in adjusted position on said main section, and a weep hole leading from the bottom of said recess.

5. A piston comprising a main section, a shoe having a recess receiving said main section and movable thereon, and one or more reinforcing rivets passing through said shoe beneath the bottom of said recess.

6. A piston comprising a main section, a shoe having a recess receiving said main section and movable thereon, a wedge shaped recess forming an extension of said first named recess and disposed on one side of said main section, and a member of soft material driven into said wedge shaped recess to hold said shoe on said main section.

7. A piston comprising a main section, a shoe having a recess receiving said main section and movable thereon, a wedge shaped recess forming an extension of said fir t named recess and disposed on one side of said main section, and a member of soft material driven into said wedge shaped recess to hold said shoe on said main section, said wedge shaped recess terminating in a groove, said member being of greater diameter than the width of said wedge shaped recess at its bottom above said groove.

8. A piston comprising a main section, a shoe having a recess receiving said main section and movable thereon, and means for the insertion of wedges on the edge of said piston adjacent the points where said shoe meets said upper section, for the purpose set forth.

9. In combination a cylinder, a piston disposed in said cylinder and having its lower portion fitting said cylinder and of substantially the same radius as the inside thereof, the upper portion of said piston having a clearance between its edge and said cylinder, one or more piston rings on said piston and having their joints disposed in said lower portion, and means permitting the pressure of steam in said cylinder to force said piston rings outwardly in said upper portion of said piston.

EDWIN M. NELSON.